United States Patent Office 3,346,326
Patented Oct. 10, 1967

3,346,326
CONTROLLED SAPONIFICATION OF FIBROUS POLYGLUTAMIC ACID ESTERS WITH AQUEOUS-ALCOHOLIC SOLUTIONS OF A BASE
Yoshifumi Takeda, Tokyo, and Toru Okuda and Setsuji Sakurai, Kanawaga-ken, Japan, assignors to Ajinomoto Co., Inc., Tokyo, Japan, a corporation of Japan
No Drawing. Filed Mar. 19, 1963, Ser. No. 266,163
Claims priority, application Japan, Apr. 3, 1962, 37/12,645
9 Claims. (Cl. 8—127.5)

This invention relates to the preparation of polypeptide fibers, and more particularly to that of fibers consisting of a homopolymer of glutamic acid or of a copolymer of glutamic acid with other amino acids.

In its more specific aspects, the invention is concerned with the production of polyamino acid fibers from fibers consisting of esters of polyglutamic acid or of the copolymers of such esters with other amino acids. The polymeric esters which are the starting materials for the method of the invention are characterized by macromolecules having recurring glutamic ester groups,

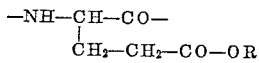

wherein OR is the radical of an alcohol, and the NH and CO radicals are respectively linked to CO and NH radicals by amide bonds.

It is well known that the ester group in the side chains of a compound of the above formula cannot normally be hydrolyzed or saponified without serious degradation of the main peptide chain. The amide bond is sensitive to the usual saponification processes.

When it was heretofore desired to prepare homopolymers or copolymers of glutamic acid from the corresponding esters including the glutamic ester groups of the above formula, it was necessary to employ milder reaction conditions than are possible in conventional saponification. A known method provides for reduction of the side chain, and is applicable only to benzyl esters. It resquires the use of relatively large quantities of relatively expensive organic solvents, such as benzene, dichloroacetic acid, and nitromethane, and the use of toxic or otherwise dangerous reagents, such as hydrogen bromide and phosphonium iodide. The complexity and cost of the known method made it impractical for industrial use.

The principal object of the invention is the preparation of polypeptide fibers having recurring glutamic acid groups on an industrial scale, from fibers having corresponding glutamic ester groups while avoiding a drastic reduction in the length of the polypeptide chains.

Another object is the saponification of recurring glutamic ester groups in polypeptide fibers by means of inexpensive reagents, such as the hydroxides of the alkali metals.

A concomitant object is a saponificaiton process which is rapid and can be carried out with a minimum of manipulative steps.

Yet another object is a saponification process which can be controlled to provide any desired proportion of glutamic acid groups in the fibers produced.

The above and other objects, which will become apparent as the disclosure proceeds, are achieved by carrying out the saponification of the recurring glutamic ester groups in polypeptide fibers in a heterogeneous system in which the polymeric glutamic ester fibers constitute one phase while the alkaline saponification agent is initially contained in a separate phase, such as an aqueous alcohol. The saponification thus takes place at the interface of the two phases, or in the immediate vicinity of the interface, and the degradation of the polymer chain is thereby held to a minimum. Quite surprisingly, saponification proceeds rapidly in such a heterogeneous system.

The saponification according to our invention may be carried out by immersing polypeptide fibers containing recurring glutamic ester groups in a solution of an alkali metal hydroxide in a mixture of an alcohol with water. The shape of the fibers is not altered when the conditions set forth hereinafter are maintained. The method is applicable to unstretched fibers having the configuration of an intramolecularly hydrogen-bonded helix, as well as to stretched fibers of the intermolecularly hydrogen-bonded extended type.

The alkali metal salts obtained by saponification of the glutamic ester groups are converted to the free acid groups by contact with the aqueous solution of an acid. The side chains of the polypeptide fibers obtained have free carboxyl radicals. The amide linkages of the main polypeptide chains suffer but a minimum of damage during saponification according to our method.

We have found that saponification according to our invention does not affect the spatial configuration of atoms linked to the carbon atom in the alpha position of the glutamic ester group. When the starting material is a polymer in which glutamic ester groups are optically active, the alkali salt and the free acid obtained by saponification and acidification show substantially unchanged configuration, and the corresponding optical activity. It is well known that polypeptide esters including recurring optically active glutamic ester groups are largely racemized by the known homogeneous saponification methods. In view of the fact that polypeptide materials having recurring optically active glutamic acid groups are generally superior to the corresponding racemic fibers, the present invention provides a significantly improved product.

The saponification reaction of the invention may be carried out with the most readily available lower alkyl ester, such as the methyl or ethyl esters of the glutamic acid groups in the polypeptide fibers. The fineness of the fibers formed may be chosen at will if partial or incomplete saponification of the ester groups is acceptable. Very heavy fibers, of course, cannot be adequately penetrated by the alkali solution within a practical period. When complete saponification is desired, the fibers should not be heavier than 100 deniers.

Representative alkali metal hydroxides which may be employed as saponification agents are the hydroxides of lithium, sodium, and potassium. The monohydric alkanols which are capable of being mixed with water to the desired extent are limited to methanol, ethanol, and the propanols. The preferred concentration of the alkaline saponification agent is between 0.1 and 0.5 normal. Best results are obtained when the ratio of alcohol to water in the liquid phase of the saponification system is between 2 to 1 and 15 to 1 by volume. The alcohol in the liquid phase increases the rate of saponification and prevents dissolution and swelling of the fibers.

The saponification temperature should be between −10° C. and +30° C. At the lower end of this range, the rate of saponification is relatively low, and the time required for substantially complete saponification is correspondingly high. At the upper end of the temperature range, the rate of degradation of the polypeptide chain is sufficiently high to be objectionable under certain circumstances. The most advantageous combination of rapid saponification with minimal damage to the polypeptide chain is, therefore, achieved between temperatures of 0° C. and 20° C., and operation in this range is preferred.

The progress of the saponification reaction is readily observed by determination of the free alkali hydroxide in the liquid phase. The reaction may, therefore, be interrupted when any desired degree of partial saponification is reached, so that fibers containing predetermined proportions of glutamic ester and free glutamic acid groups may be readily obtained.

The alkali metal salt of the polypeptide obtained by saponification is quickly converted to the free corresponding acid by contact with an aqueous acid medium. Any reasonably strong acid may be used, and its solution is preferably more than 2-normal in order to prevent the fibers from dissolving, swelling or adhering to each other.

The method of the invention permits the production of polypeptide fibers having an intrinsic viscosity of more than 1.0 when measured in aqueous solutions of their alkali metal salts. The saponification of the esters employed as a starting material is thus performed with no more than minimal damage to the main polypeptide chain.

The following examples additionally illustrate the method of the invention but it will be understood that the invention is not limited thereto.

*Example 1*

A saponification liquid was prepared from 3.36 grams sodium hydroxide and a sufficient amount of a 4:1 mixture of ethanol and water to make the combined volume 420 milliliters. Ten grams of polypeptide fibers were immersed in the saponification liquid at 0° C. for 17 hours. The fibers consisted of gamma-methyl L-polyglutamate having an intrinsic viscosity in dichloroacetic acid of 3.09, and a degree of polymerization of 2800. The sodium hydroxide in the liquid phase was initially 20 percent more than the equivalent of the methyl ester groups in the solid phase constituted by the fibers. The fibers had a denier count of 40.

The fibers of sodium poly-L-glutamate formed by saponification were withdrawn from the saponification liquid, washed in ethanol, and dried. They weighed 10.5 grams. They were then immersed for one minute in 4-normal aqueous hydrochloric acid solution, and converted to poly-L-glutamic acid fibers which weighed 9.1 grams after washing and drying, indicating a yield of 100% in the acidification step.

A determination of the methoxyl groups in the final product by Zeisl's method shows that the saponification had removed 96% of the original methyl radicals. The intrinsic viscosity of the polyglutamic acid fiber material was 1.75, indicating a degree of polymerization of 1200 and a molecular weight of 155,000.

The poly-L-glutamic acid fibers produced had a dry tenacity of 1.22 grams per denier, an elongation of 10.96%, a water absorbency of 9.2% and a specific optical rotation $[\alpha]_D^{20}$ of 99.1° (c.=0.429 grams per 100 milliliters of 5% $NaHCO_3$ solution).

A sample of the polyglutamic acid fibers was depolymerized by refluxing for six hours in 47.7% hydrobromic acid. The glutamic acid formed had a specific optical rotation of +26.3°. When L-glutamic acid was treated in the same manner, it showed a specific rotation of +26.3°. Little, if any racemization is thus seen to have occurred during saponification and other steps of the method of the invention.

*Example 2*

A saponification liquid was prepared from 84 milliliters isopropanol, 252 milliliters ethanol, 84 milliliters water, and 3.36 grams sodium hydroxide. Ten grams of fibrous gamma-methyl poly-L-glutamate (intrinsic viscosity 3.09 D.P. 2800, 10 denier) were immersed in the saponification liquid for 17 hours at 0° C. When further treated in the manner of Example 1, the fibrous material was converted to poly-L-glutamic acid fibers weighing 9.1 grams and containing 4.4% unsaponified ester groups. The intrinsic viscosity of the polyglutamic acid fibers was 1.01 corresponding to a D.P. of 700 and a molecular weight of 90,000.

*Example 3*

The procedure of Example 2 was repeated, but the saponification was carried out at 20° C., and saponification of the side chains was completed within 80 minutes. There were obtained 9.0 grams poly-L-glutamic acid fibers having an intrinsic viscosity of 1.42 corresponding to a D.P. of 980 and a molecular weight of 126,000.

*Example 4*

A saponification liquid was prepared from 84 milliliters water, 336 milliliters, ethanol, and 3.36 grams sodium hydroxide. Ten grams gamma-methyl poly-D-glutamate fibers having a D.P. of 2,300 were immersed in the liquid for 80 minutes at 20° C. The saponified fibers were withdrawn from the solution, washed with ethanol and dried. They were converted from the sodium salt to the free polyglutamic acid form by treatment with 4-normal hydrochloric acid. The polyglutamic acid fibers ultimately obtained weighed 9.0 grams, and had an intrinsic viscosity of 1.18 corresponding to a D.P. of 810 and a molecular weight of 105,000.

*Example 5*

Fibers were prepared from a 1:1 copolymer of gamma-methyl L-glutamate and L-alanine having an intrinsic viscosity of 3.55 in dichloroacetic acid. Twenty grams of the fibers were immersed in 560 milliliters of a saponification liquid prepared from 4.48 grams sodium hydroxide and a 4:1 mixture of methanol and water. The sodium hydroxide present was in 20% excess over the methyl radicals in the side chains of the polymer. Saponification was permitted to proceed for 17 hours at 0° C.

The ester groups of the polypeptide side chains were converted to sodium carboxylate groups which were further converted to free carboxyl radicals by contact with acid in the manner described in the preceding examples. There were obtained 18.7 grams fibers of a 1:1 copolymer of glutamic acid and L-alanine having an intrinsic viscosity of 2.0, a D.P. of 1370, and a molecular weight of 137,000. The fibers were almost transparent and sparkled in the light. Their dry tenacity was 2 grams per denier, and their elongation 8.5%.

*Example 6*

The procedure of Example 5 was repeated but the fibers used as a starting material consisted of a 1:1 copolymer of DL-norvaline with gamma-methyl L-glutamate. The results obtained were analogous to those of Example 5.

*Example 7*

A saponification liquid was prepared from 305.5 milliliters ethanol, 76.5 milliliters water, and 3.06 grams sodium hydroxide. Ten grams fibers of gamma-ethyl poly-L-glutamate having an intrinsic viscosity of 2.41 (D.P. 2100) were immersed in the liquid at 25° C. for 150 minutes and then converted to the free acid form as described above.

The fibers obtained weighed 8.2 grams and showed 96.4% saponification. They had an intrinsic viscosity of 1.64 corresponding to a degree of polymerization of 1130 and a molecular weight of 146,000.

*Example 8*

A saponification liquid was prepared from 280 milliliters ethanol, 70 milliliters water, and 1.67 grams lithium hydroxide. Ten grams fibers of gamma-methyl poly-D-glutamate having a D.P. of 2400 were immersed in the liquid for 40 minutes at 20° C. The lithium salt of polyglutamic acid produced was converted to the free acid while the fibers still contained 2.6% of the original ester groups. The poly-D-glutamic acid fibers had an intrinsic viscosity of 1.1 corresponding to a D.P. of 760, and to a molecular weight of 98,000.

Example 9

The procedure of Example 8 was repeated but an equimolecular amount of potassium hydroxide was substituted for the lithium hydroxide, and saponification was interrupted after 30 minutes. The conversion of the ester groups to the free carboxyl groups was 97.0%. The intrinsic viscosity was 1.01, the D.P. 700, and the molecular weight 90,000.

The preceding examples will suffice to show that the present invention provides a convenient method of preparing polypeptide fibers having recurring groups

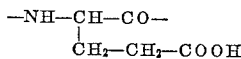

from the corresponding esters. The method is applicable to fibers which consist practically in their entirety of the above recurring groups, and to fibers of co-polymeric material in which the several recurring groups according to the above formula are separated by recurring radicals of other amino acids. High yields of fibers having excellent properties are obtained with a minimum number of simple manipulative steps involving very inexpensive reagents and solvents. The solvents may be recovered at least in part, as is conventional.

The fibers produced are useful not only in textile manufacturing but also for medical, and particularly for surgical use.

While various specific embodiments of the invention have been described, it is to be understood that the invention is not limited thereto, but that the method of the invention may be modified and altered in many ways by those skilled in the art without departing from the scope and spirit of the attached claims.

What we claim is:

1. A method of preparing polypeptide fibers the molecules of which have recurring groups

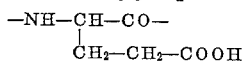

which comprises immersing fibers of a polymer having recurring groups

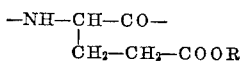

in the molecule thereof, wherein R is a lower alkyl radical, in a solution of an alkaline saponification agent in a liquid mixture of water and a water-soluble alcohol, holding said fibers immersed as a solid phase in said liquid mixture until said lower alkyl radicals are at least partly displaced, and thereafter contacting said fibers with an acid.

2. A method as set forth in claim 1, wherein said saponification agent is an alkali metal hydroxide, whereby said lower alkyl radical of the immersed fibers is at least partly replaced by said alkali metal.

3. A method as set forth in claim 1, wherein said mixture consists essentially of a major amount of said water soluble alcohol, and of a minor amount of said water.

4. A method as set forth in claim 1, wherein the ratio of said water and of said water soluble alcohol in said mixture is between 2 to 1 and 15 to 1.

5. A method as set forth in claim 1, wherein said alcohol is an alkanol having one to three carbon atoms.

6. A method as set forth in claim 1, wherein the temperature of said liquid phase is held between —10° C. and +30° C. while said fibers are immersed therein.

7. A method as set forth in claim 6, wherein said saponification agent is an alkali metal hydroxide, whereby said lower alkyl radical is at least partly replaced by said alkali metal, and said liquid phase is a mixture of an alkanol having one to three carbon atoms, and of water, the ratio of said alkanol to said water in said mixture being between 2 to 1 and 15 to 1.

8. A method as set forth in claim 7, wherein R is selected from the group consisting of methyl and ethyl radicals.

9. A method as set forth in claim 7, wherein said alkanol is monohydric.

References Cited

UNITED STATES PATENTS 2,866,783   12/1958   Bovarnick _____ 167—78

FOREIGN PATENTS 125,153   4/1919   Great Britain.

OTHER REFERENCES

Hanby et al.: Nature, vol. 161, p. 132 (1948).

NORMAN G. TORCHIN, *Primary Examiner.*

J. C. CANNON, *Assistant Examiner.*